(12) United States Patent
Nakayama

(10) Patent No.: US 10,768,419 B2
(45) Date of Patent: Sep. 8, 2020

(54) HEAD-UP DISPLAY DEVICE

(71) Applicant: Panasonic Intellectual Property Management Co., Ltd., Osaka (JP)

(72) Inventor: Kenji Nakayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 77 days.

(21) Appl. No.: 16/149,442

(22) Filed: Oct. 2, 2018

(65) Prior Publication Data

US 2019/0033591 A1    Jan. 31, 2019

Related U.S. Application Data

(63) Continuation of application No. PCT/JP2017/015408, filed on Apr. 17, 2017.

(30) Foreign Application Priority Data

Apr. 28, 2016    (JP) .................................. 2016-091523

(51) Int. Cl.
*G02B 27/01*    (2006.01)
*B60K 35/00*    (2006.01)
*H04N 5/74*    (2006.01)

(52) U.S. Cl.
CPC .......... *G02B 27/0149* (2013.01); *B60K 35/00* (2013.01); *G02B 27/01* (2013.01);
(Continued)

(58) Field of Classification Search
CPC .......... G02B 27/0149; G02B 2027/015; G02B 2027/0154; G02B 2027/0156;
(Continued)

(56) References Cited

U.S. PATENT DOCUMENTS 6,012,785 A    1/2000 Kawasaki
6,049,288 A *   4/2000 Kawasaki .............. G01D 11/24
                                                340/815.4
(Continued)

FOREIGN PATENT DOCUMENTS

JP    10-278633 A    10/1998
JP    2005-062812 A    3/2005
(Continued)

OTHER PUBLICATIONS

International Search Report of PCT application No. PCT/JP2017/015408 dated Jun. 6, 2017.

*Primary Examiner* — Nicholas R. Pasko
(74) *Attorney, Agent, or Firm* — Greenblum & Bernstein, P.L.C.

(57) ABSTRACT

In a head-up display device, first and second cover parts of a cover each cover an opening. The first cover part is turnable about a first rotation fulcrum fixed to a housing, with respect to the housing. The second cover part is turnable about a second rotation fulcrum fixed to first and second ends of the first cover part, with respect to the first cover part. The head-up display device includes a biasing member that biases the second cover part toward the outside of the housing when the cover covers the opening.

6 Claims, 8 Drawing Sheets

(52) U.S. Cl.
CPC .... *B60K 2370/334* (2019.05); *B60K 2370/67* (2019.05); *G02B 27/0101* (2013.01); *G02B 2027/0154* (2013.01); *H04N 5/74* (2013.01)

(58) Field of Classification Search
CPC .... G02B 2027/0159; G02B 2027/0161; G02B 2027/0163; G02B 2027/0165; G02B 2027/0169; B60K 35/00; B60K 37/02; B60K 2370/66; B60K 2370/67; B60K 2370/334
USPC .................................................. 359/630–633
See application file for complete search history.

(56) References Cited

U.S. PATENT DOCUMENTS

| | | | | |
|---|---|---|---|---|
| 6,542,305 | B2 * | 4/2003 | Nakamura | G02B 27/0101 359/630 |
| 6,657,789 | B2 * | 12/2003 | Nakamura | G02B 27/0149 359/632 |
| 6,930,836 | B2 * | 8/2005 | Harada | G02B 27/0149 359/630 |
| 2005/0024490 | A1 | 2/2005 | Harada et al. | |
| 2008/0285138 | A1 | 11/2008 | Lebreton | |
| 2015/0146299 | A1 * | 5/2015 | Koseki | G02B 27/0101 359/632 |
| 2017/0123205 | A1 * | 5/2017 | Quiroz De La Mora | G02B 27/0149 |
| 2017/0242257 | A1 * | 8/2017 | Tatekawa | G02B 27/0149 |
| 2017/0336633 | A1 * | 11/2017 | Yagi | B60K 35/00 |
| 2017/0354046 | A1 * | 12/2017 | Chien | B60R 1/00 |
| 2018/0129125 | A1 * | 5/2018 | Chen | G02B 27/0149 |
| 2018/0157041 | A1 * | 6/2018 | Huang | G02B 27/0006 |
| 2018/0373031 | A1 * | 12/2018 | Nakayama | G02B 27/01 |
| 2019/0041640 | A1 * | 2/2019 | Hisatsugu | G02B 27/0149 |

FOREIGN PATENT DOCUMENTS

| | | | |
|---|---|---|---|
| JP | 5020252 B | 9/2012 | |
| WO | WO-2012169556 A1 * | 12/2012 | ......... B60R 11/0235 |

* cited by examiner

HEAD-UP DISPLAY DEVICE

CROSS-REFERENCE TO RELATED APPLICATIONS

This application is a continuation of the PCT International Application No. PCT/JP2017/015408 filed on Apr. 17, 2017, which claims the benefit of foreign priority of Japanese patent application No. 2016-091523 filed on Apr. 28, 2016, the contents all of which are incorporated herein by reference.

BACKGROUND

1. Technical Field

The present disclosure relates to a head-up display device.

2. Description of the Related Art

Head-up displays (HUDs) have conventionally been known which are mounted in vehicles such as automobiles. Moreover, as an example of the head-up displays, systems have been known in each of which information is displayed on a combiner to assist a driver of a vehicle. The combiner is disposed in an upright position in front of the driver. Unfortunately, there is a problem that, when the combiner is not used by any driver, such an upright combiner will be in sight of the driver, obstructing the driving.

To address such a problem, head-up display devices are disclosed each of which employs a housing device with which a combiner is housed in an instrumental panel (also referred to as a dashboard) while the combiner is not being used (see Japanese Patent No. 5020252). Some of the head-up display devices each use a cover to hide both an optical path and the combiner while the combiner is being housed, for a better appearance-design quality.

SUMMARY

The present disclosure is aimed at providing a head-up display device that is capable of more stably keeping a contact state between a housing and a cover where the cover is in a closing state with a force to push it downward.

A head-up display device according to an aspect of the present disclosure, includes a projector for projecting light, mirror, combiner, housing, cover, and biasing member. The mirror reflects the light projected by the projector. The reflected light is projected onto the combiner. The housing accommodates the projector and the mirror, and has an opening through which the reflected light passes to be projected on the combiner. The cover includes a first cover part and a second cover part which cover the opening. The biasing member biases the second cover part toward an outside of the housing when the cover covers the opening. The first cover part is turnable about a first rotation fulcrum that is fixed to the housing, with respect to the housing. The first cover part includes a first end part and a second end part which are located on an end of the first cover part farthest from the first rotation fulcrum. The second cover part is turnable about a second rotation fulcrum that is fixed to both the first end part and the second end part, with respect to the first cover part.

In accordance with the present disclosure, the head-up display device is capable of more stably keeping the contact state between the housing and the cover where the cover is in the closing state with a force to push it downward.

DETAILED DESCRIPTION OF PREFERRED EMBODIMENTS

Prior to descriptions of embodiments of the present disclosure, problems of conventional head-up display devices will be briefly described. In a case where a cover is used to hide an optical path and a combiner when the combiner is accommodated in a housing, a structure is known in which the cover closes off an opening of the housing. According to the structure, an end part of the cover comes, from below, in contact with an edge on the opening side of the housing. In this structure, the end part of the cover in a closing state is in contact with the housing.

A head-up display device is disposed in an instrumental panel. So, there are cases where some articles, such as coins and ornaments, which have been placed on the instrumental panel, move to places onto the cover, accompanying the movement of a vehicle. In these cases, weight of the articles having moved onto the cover in the closing state will cause the end part of the cover to be released from the state of being in contact with the housing. This makes a clearance between the housing and the cover, causing the articles to drop through the clearance.

Moreover, while the vehicle is vibrating, the releasing of the end part of the cover in the closing state from the state of being in contact with the housing will cause the end part of the cover to hit the housing. This generates a rattle sound accompanying the vibration of the vehicle.

Furthermore, consider a case in which a user of the vehicle pushes the cover being in the closing state. If the pushing causes an unexpectedly-easy release of the cover from being in the closing state, it leads to a decrease in value, as a product, of the head-up display.

To address these problems, it is required to keep the cover being in contact with the housing, even while the cover in the closing state is subjected to a pushing force.

Hereinafter, detailed descriptions will be made regarding the embodiments of the present disclosure, with reference to the accompanying drawings.

First Exemplary Embodiment

Figure 1:
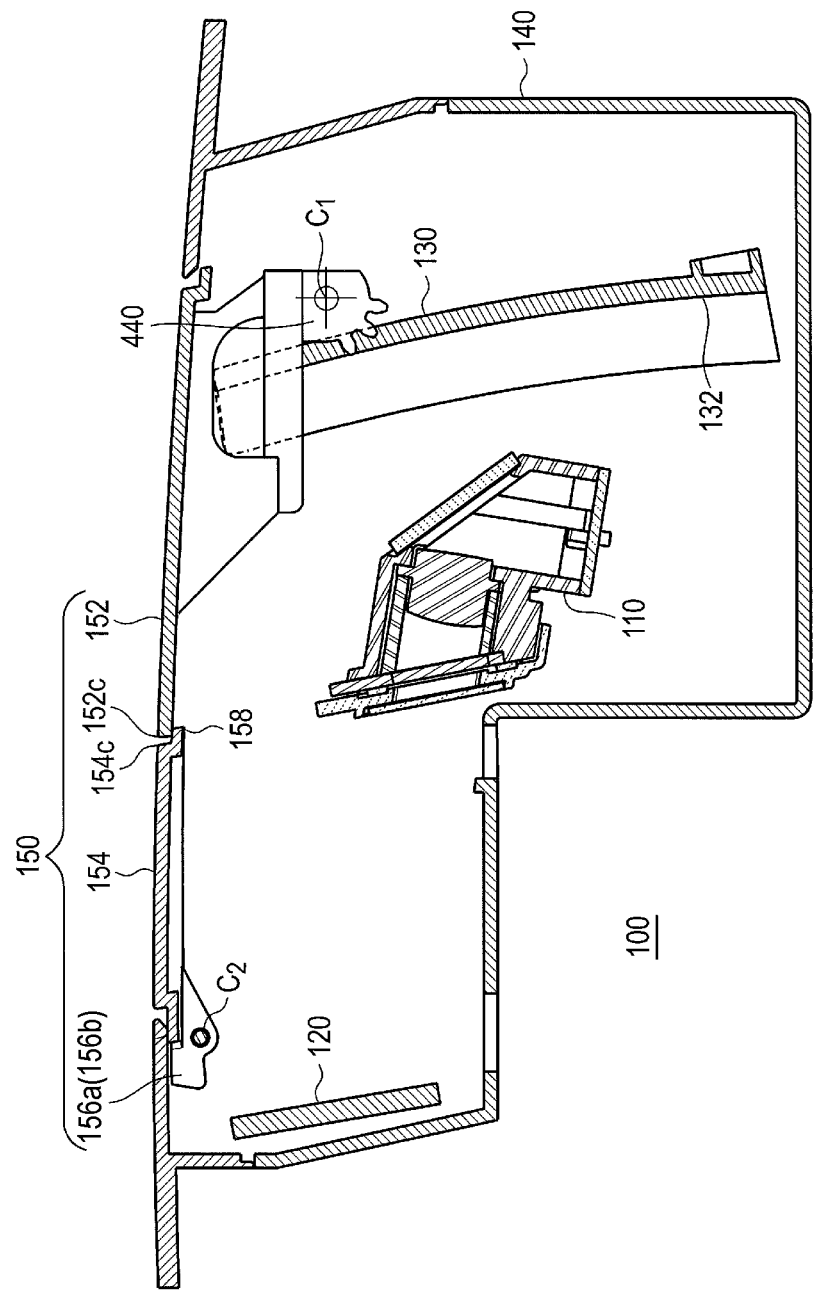
FIG. 1 is a cross-sectional view of a head-up display device according to a first embodiment of the present disclosure, when a combiner is housed.
Figure 2:
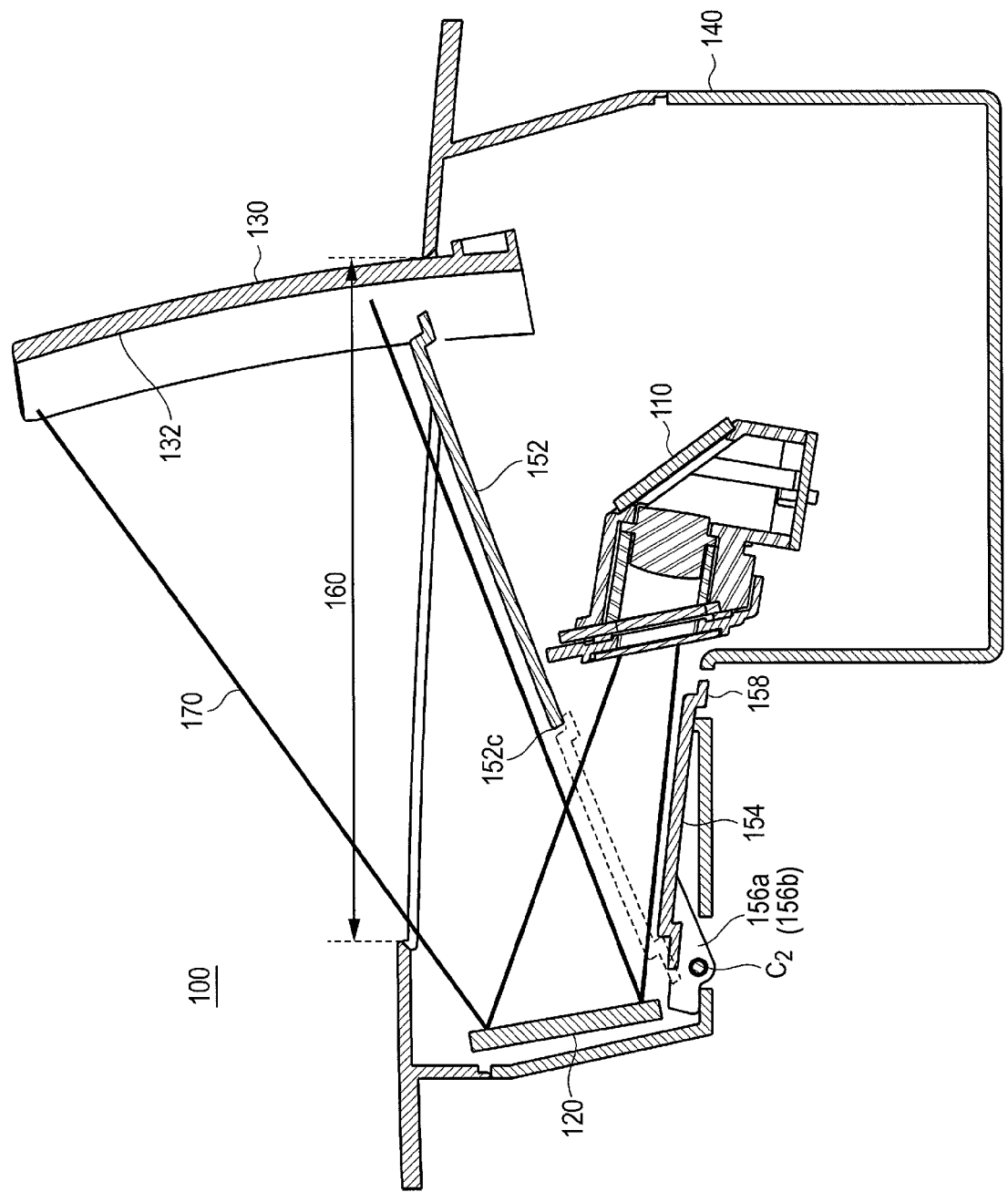
FIG. 2 is a cross-sectional view of the head-up display device shown in FIG. 1, when the combiner is lifted up.
Figure 3:
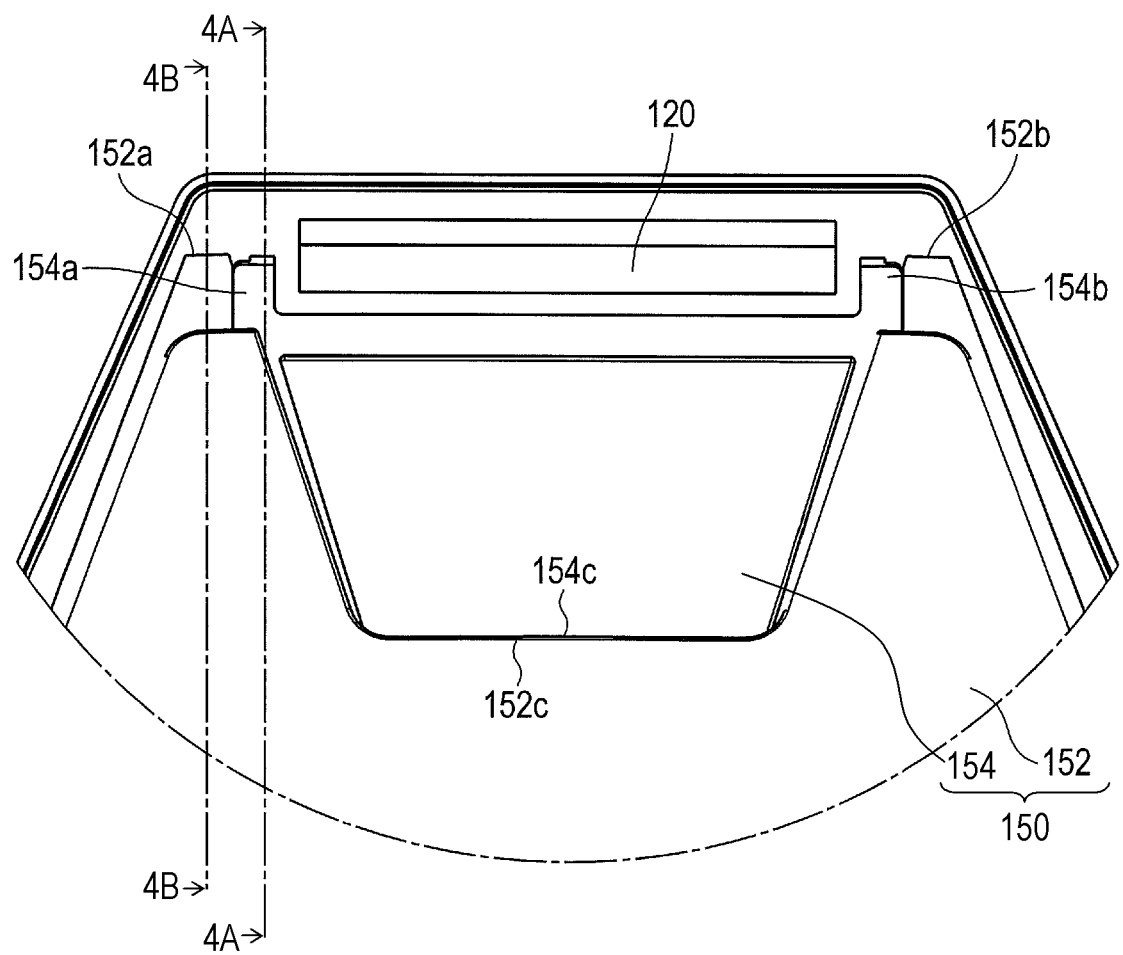
FIG. 3 is a top view of the vicinity of a second cover part of the head-up display device shown in FIG. 1, when a cover is opened.

FIG. 1 is a cross-sectional view of head-up display device 100 according to a first embodiment of the present disclosure, when combiner 130 is housed. FIG. 2 is a cross-sectional view of head-up display device 100 when combiner 130 is lifted up. FIG. 3 is a top view of the vicinity of second cover part 154 of head-up display device 100, when cover 150 is opened. Head-up display device 100 is disposed in an instrumental panel (also referred to as a dashboard) of a vehicle, for example.

As shown in FIG. 1, head-up display device 100 includes projector 110, mirror 120, combiner 130, housing 140, and cover 150. Housing 140 accommodates projector 110 and mirror 120. For example, housing 140 is disposed such that it can house combiner 130. Cover 150 is disposed to cover opening 160 of housing 140, thereby closing off and releasing opening 160 of housing 140.

Combiner 130 is disposed such that, when cover 150 releases opening 160, combiner 130 is lifted up through opening 160. Combiner 130 is a half mirror, for example. Combiner 130 is configured with a glass plate and a semi-transparent film that is deposited, with tin, silver or the like, on one side of the glass plate. A user can look ahead of the vehicle through combiner 130.

When combiner 130 is lifted up, light projected from projector 110 is reflected off mirror 120, and the thus-reflected light is then projected as an image onto combiner projection screen 132. When the image is projected onto combiner projection screen 132, the reflected light passes through opening 160. This allows the user to see the image projected on combiner 130 in a manner that the image is overlaid onto the sight in front of the vehicle. Such an image indicates a vehicle speed, an amount of remaining fuel, etc., for example. Alternatively, it indicates a distance to destination, direction of travel, current location, names of facilities and shops near the current location, etc., for example. In an example, combiner 130 is coupled to a combiner lifting apparatus (not shown) which is accommodated in housing 140 and is to lift up combiner 130.

Cover 150 includes first cover part 152 and second cover part 154. First cover part 152 includes first end part 152a, second end part 152b, and side surface 152c. Second cover part 154 includes first end part 154a, second end part 154b, first engagement part 156a, second engagement part 156b, and third engagement part 158. First engagement part 156a is disposed in the vicinity of first end part 152a, and second engagement part 156b is disposed in the vicinity of second end part 152b.

First cover part 152 includes gear part 440. Gear part 440 is fixed to first cover part 152. A cover opening-closing mechanism (not shown) drives gear part 440 to cause first cover part 152 to turn about first rotation fulcrum $C_1$ with respect to housing 140. First rotation fulcrum $C_1$ is fixed to housing 140. First end part 152a and second end part 152b are located on the same side of first cover part 152. First end part 152a and second end part 152b are located on the respective sides opposite to each other, of first cover part 152, with respect to first rotation fulcrum $C_1$. For example, the cover opening-closing mechanism includes an electric motor (not shown) which drives gear part 440.

Second cover part 154 is coupled to first cover part 152 turnably about second rotation fulcrum $C_2$ that is fixed to both first end part 152a and second end part 152b of first cover part 152. Coupling members for coupling second cover part 154 to first cover part 152 are the following rotary shafts, for example. That is, one of the rotary shafts penetrates both the vicinity of first end part 152a of first cover part 152 and the vicinity of first end part 154a of second cover part 154, and the other of the rotary shafts penetrates both the vicinity of first end part 152b of first cover part 152 and the vicinity of first end part 154b of second cover part 154.

When first engagement part 156a and second engagement part 156b are engaged with an end part of housing 140 on the opening 160 side, first cover part 152 and second cover part 154 become substantially flush with each other thereby to cover opening 160, which causes cover 150 to close off opening 160. First engagement part 156a and second engagement part 156b are fixed to first end part 154a and second end part 154b of second cover part 154, respectively.

Third engagement part 158 is fixed to the vicinity of first side surface 154c on the first rotation fulcrum $C_1$ side of second cover part 154. When first engagement part 156a and second engagement part 156b are engaged with the end part of housing 140 on the opening 160 side, third engagement part 158 is in contact with the vicinity of side surface 152c of first cover part 152. Side surface 152c faces first side surface 154c of second cover part 154 on the first rotation fulcrum $C_1$ side. In this state, first side surface 154c of second cover part 154 on the first rotation fulcrum $C_1$ side faces first cover part 152, and first cover part 152 and second cover part 154 are substantially flush with each other thereby to cover opening 160.

In an example, biasing members are disposed. The biasing members bias second cover part 154 toward the outside of housing 140 when third engagement part 158 is in contact with the vicinity of side surface 152c of first cover part 152. The biasing members are elastic members, for example, which are added to the coupling members for coupling second cover part 154 to first cover part 152. The biasing members will be described later with reference to FIGS. 6A to 6C. With this configuration, in cases where cover 150 closes off opening 160, even if a force is applied to push down second cover part 154, cover 150 easily keeps closing off opening 160.

Next, a release operation of cover 150 that has closed off opening 160 is described. When the release operation of cover 150 is started accompanying the lifting of combiner 130, second cover part 154 together with first cover part 152 turns about first rotation fulcrum $C_1$ fixed to housing 140, with respect to housing 140, until both first engagement part 156a and second engagement part 156b reach a bottom part of housing 140.

Next, when first engagement part 156a and second engagement part 156b reach the bottom part of housing 140, first engagement part 156a and second engagement part 156b come to be engaged with the bottom part of housing 140. Then, first engagement part 156a and second engagement part 156b bias second cover part 154 downward, thereby turning second cover part 154 about second rotation fulcrum $C_2$ with respect to first cover part 152. This configuration causes second cover part 154 to be turnable only in accordance with a drive force that is applied to first cover part 152, which eliminates the need for disposing an additional driving apparatus to be used exclusively for second cover part 154. In this way, when first cover part 152 is turned with respect to housing 140, first engagement part 156a and second engagement part 156b are engaged with the bottom part of housing 140. As a result, a part of second cover part 154 is pushed toward the bottom part of housing 140, which causes second cover part 154 to turn about second rotation fulcrum $C_2$, with respect to first cover part 152.

When second cover part 154 turns about second rotation fulcrum $C_2$ with respect to first cover part 152 and third engagement part 158 reaches the bottom part of housing 140, third engagement part 158 comes in contact with the bottom part of housing 140. In this state, second cover part 154 comes to be absent in an optical path along which light is projected from projector 110 onto mirror 120, thereby securing optical path 170 of the light projected from projector 110.

Figure 4A:
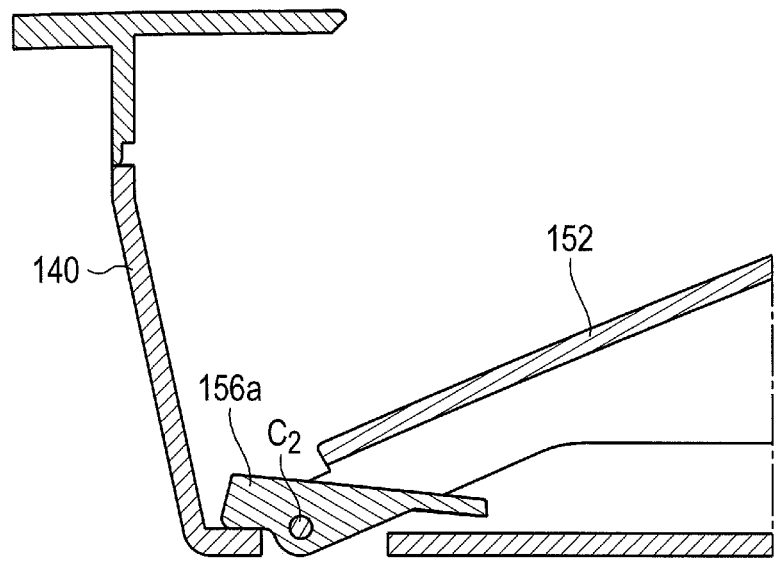
FIG. 4A is a cross-sectional view taken along line 4A-4A of FIG. 3.
Figure 4B:
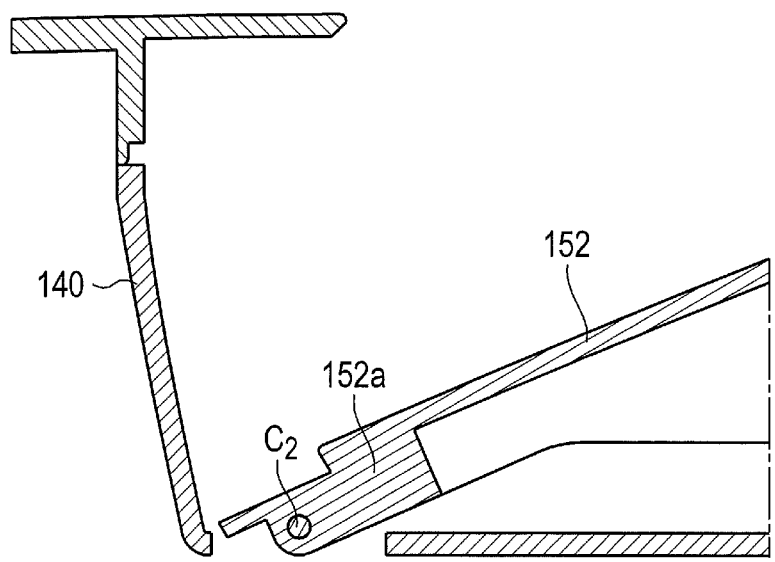
FIG. 4B is a cross-sectional view taken along line 4B-4B of FIG. 3.

FIG. 4A is a cross-sectional view of head-up display device 100 shown in FIG. 3, taken along line 4A-4A. FIG. 4B is a cross-sectional view of head-up display device 100 shown in FIG. 3, taken along line 4B-4B. In FIG. 4A, second cover part 154 is partially omitted. As shown in FIGS. 4A and 4B, when first cover part 152 is released, first engagement part 156a which is fixed to first end part 154a of second cover part 154 is engaged with the bottom part of housing 140. On the other hand, first end part 152a of first cover part 152 is not in contact with the bottom part of housing 140. This is true also for second engagement part 156b and second end part 152b. With this configuration, when first cover part 152 is released, cover 150 is allowed to be in contact with the bottom part of housing 140 only with two portions, i.e. first engagement part 156a and second engagement part 156b. This allows cover 150 to be more stably fixed when being released.

Figure 5A:
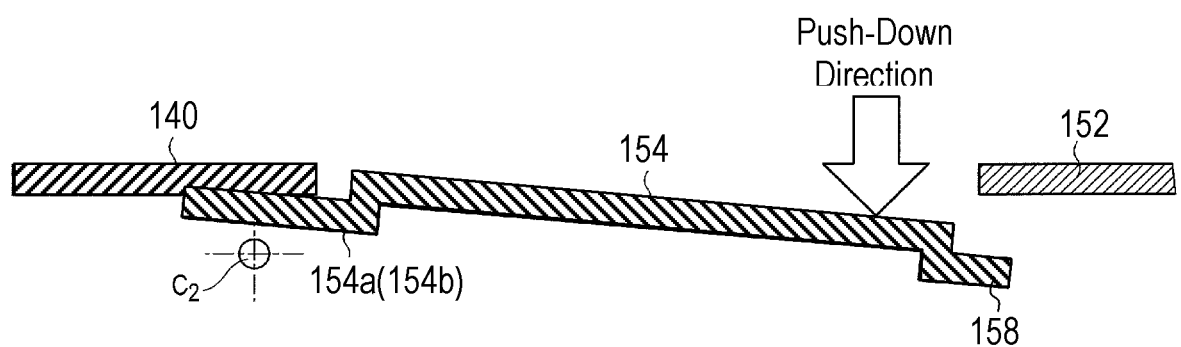
FIG. 5A is a cross-sectional view illustrating the second cover part of the head-up display device shown in FIG. 1, when the second cover part starts turning about a second rotation fulcrum from a state where the cover is closed.
Figure 5B:
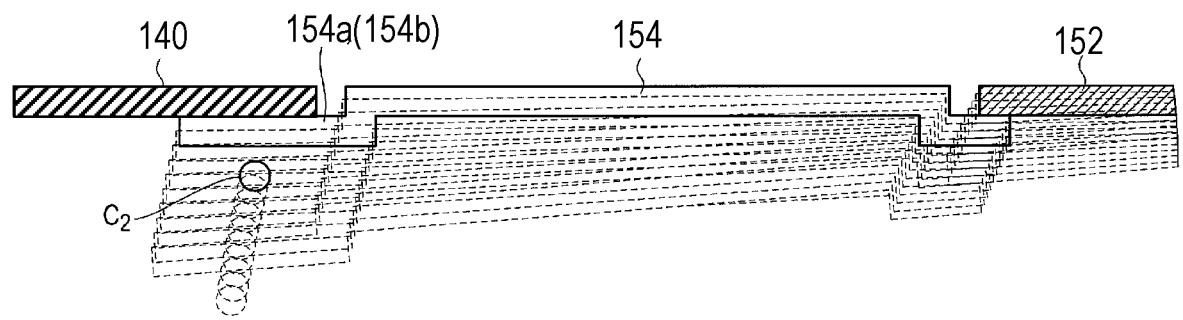
FIG. 5B is a view for illustrating the second cover part of the head-up display device shown in FIG. 1, when the second cover part starts rotating about a first rotation fulcrum from the state where the cover is closed.

FIG. 5A is a cross-sectional view for illustrating an example of second cover part 154 that starts turning about second rotation fulcrum $C_2$, from a state where cover 150 is closed. FIG. 5B is a view illustrating an example of second cover part 154 that starts turning about first rotation fulcrum $C_1$, from a state where cover 150 is closed.

In FIG. 5A, second cover part 154 is subjected to a force to push it downward. The force that pushes second cover part 154 downward acts on second rotation fulcrum $C_2$ as a force to push second rotation fulcrum $C_2$ downward, through the action of a lever with another fulcrum which is a contact point between the rear surface of housing 140 and the end part on the housing 140 side of first engagement part 156a. On the other hand, in cover 150 in the closing state, gear part 440 that is fixed to first cover part 152 supports second rotation fulcrum $C_2$.

Here, second cover part 154 is larger in dimension than first engagement part 156a or second engagement part 156b. Therefore, in accordance with law of the lever, the force pushing second rotation fulcrum $C_2$ downward is larger than the force pushing second cover part 154 downward, in particular, the force pushing the vicinity of third engagement part 158 downward. With increasing force pushing second cover part 154 downward, a critical point comes beyond which gear part 440 can no longer support second rotation fulcrum $C_2$ against the force pushing second rotation fulcrum $C_2$ downward. As a result, second cover part 154 is forced to turn about second rotation fulcrum $C_2$ with respect to first cover part 152. Therefore, introduction of a counter force that can be applied to second cover part 154, is considered against the force pushing second cover part 154 downward in order to keep the contact state more stably between housing 140 and cover 150 which is in the closing state and subjected to the force pushing second cover part 154 downward.

Figure 6A:
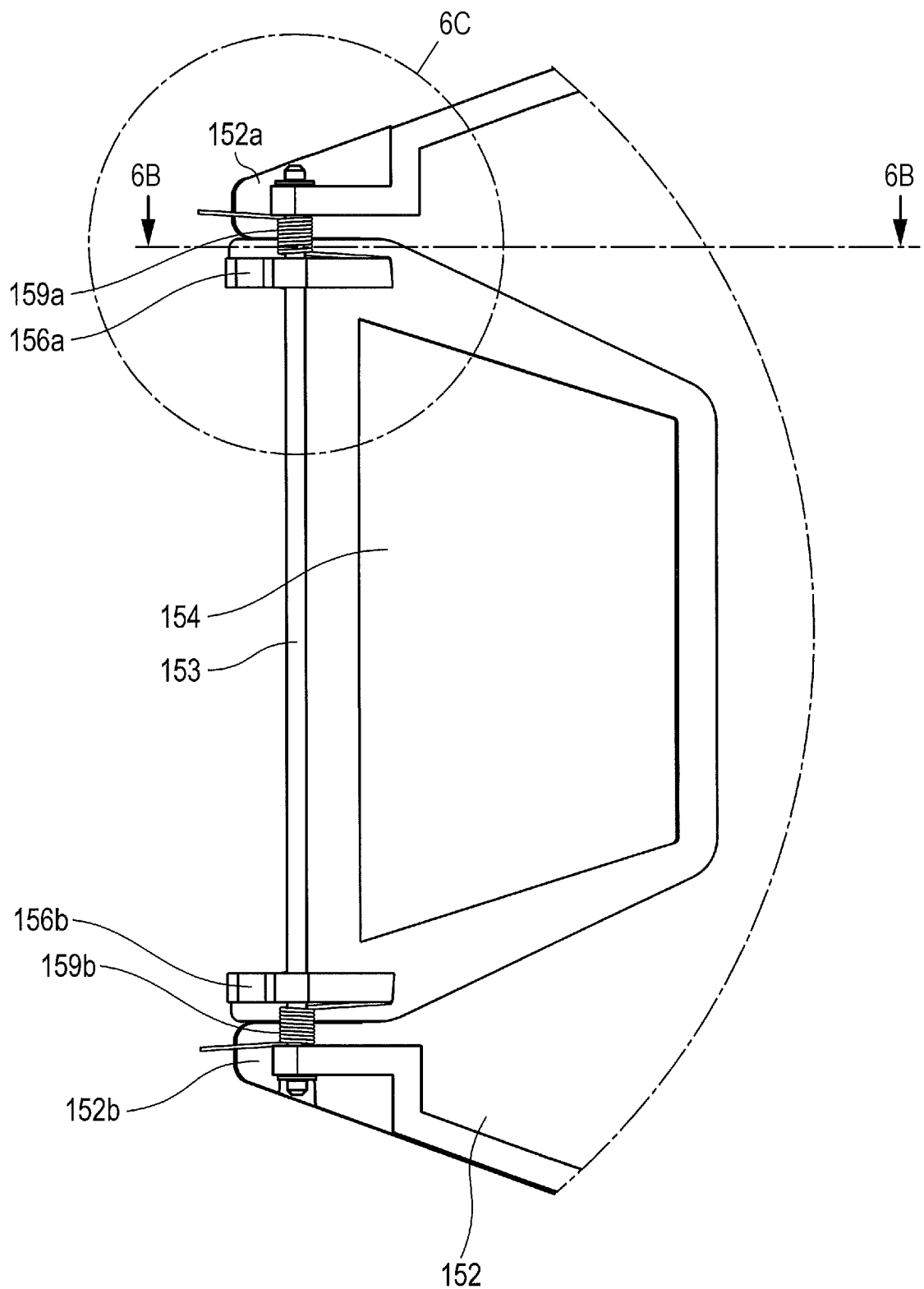
FIG. 6A is a rear view of the cover of the head-up display device shown in FIG. 1.
Figure 6B:
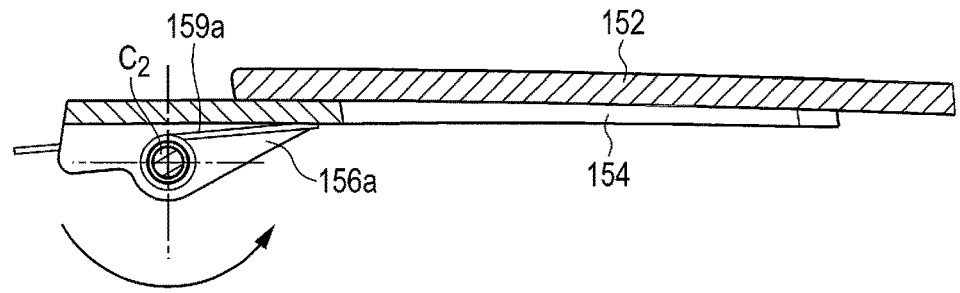
FIG. 6B is a cross-sectional view taken along line 6B-6B of FIG. 6A.
Figure 6C:
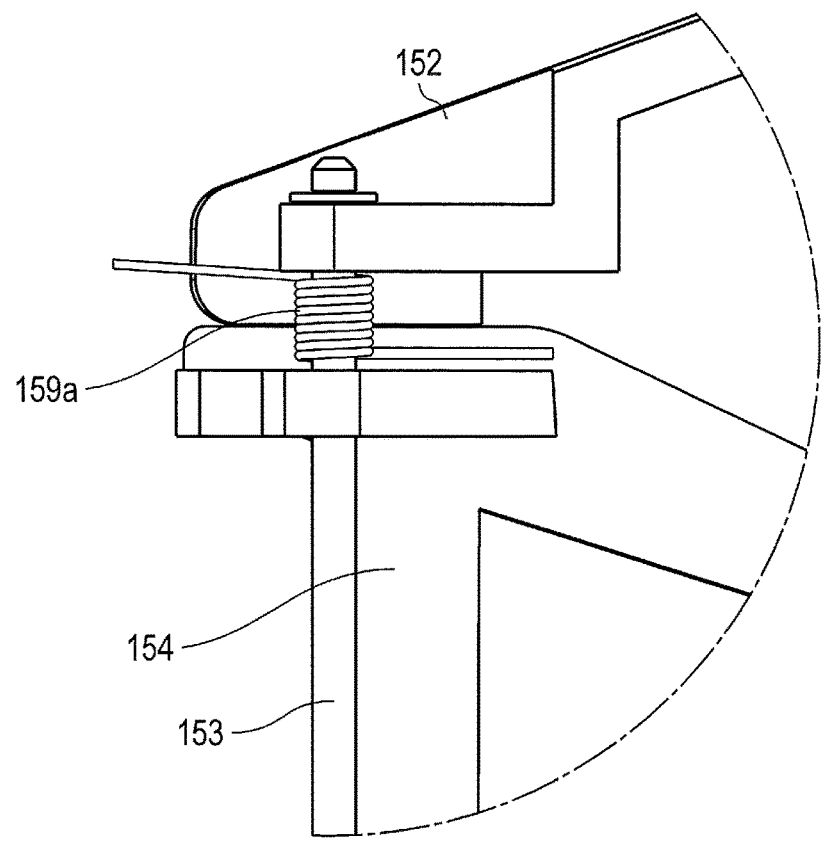
FIG. 6C is an enlarged view of the vicinity of a first engagement part shown in FIG. 6A.

FIG. 6A is a rear view of cover 150. FIG. 6B is a cross-sectional view of cover 150 shown in FIG. 6A, taken along line 6B-6B. FIG. 6C is an enlarged view of the vicinity of first engagement part 156a, illustrating part 6C indicated in FIG. 6A. In an example, as shown in FIGS. 6A to 6C, torsion coil springs 159a and 159b are disposed so as to embrace rotary shaft 153 which couples first cover part 152 and second cover part 154 together turnably about second rotation fulcrum $C_2$.

The biasing members are coil springs 159a and 159b, as one example.

Each of torsion coil springs 159a and 159b is disposed, as shown in FIGS. 6A and 6B, in the following manner. That is, one end of the spring is in contact with first cover part 152 located on the opposite side from first rotation fulcrum $C_1$ with respect to second rotation fulcrum $C_2$. Moreover, the other end is in contact with second cover part 154 located on the same side of first rotation fulcrum $C_1$ with respect to second rotation fulcrum $C_2$. As a result, as shown in FIG. 6B, restoring forces of torsion coil springs 159a and 159b bias second cover part 154 toward the outside of housing 140 (in the direction indicated by the arrow).

Strength of the restoring forces of torsion coil springs 159a and 159b is not particularly limited as long as torsion coil springs 159a and 159b can operate the following two actions. One is such that, when cover 150 is closed, the restoring forces cause first cover part 152 and second cover part 154 to keep being substantially flush with each other; the other is such that, when both first engagement part 156a and second engagement part 156b are engaged with the bottom part of housing 140, the restoring forces cause both first engagement part 156a and second engagement part 156b to bias second cover part 154 downward, thereby turning second cover part 154 about second rotation fulcrum $C_2$, with respect to first cover part 152.

The restoring forces of torsion coil springs 159a and 159b act on second cover part 154, as a counter force against the force pushing second cover part 154 downward. This configuration allows the contact state to be more stably kept between housing 140 and cover 150 which is in the closing state and subjected to the force pushing second cover part 154 downward.

Second Exemplary Embodiment

Figure 7A:
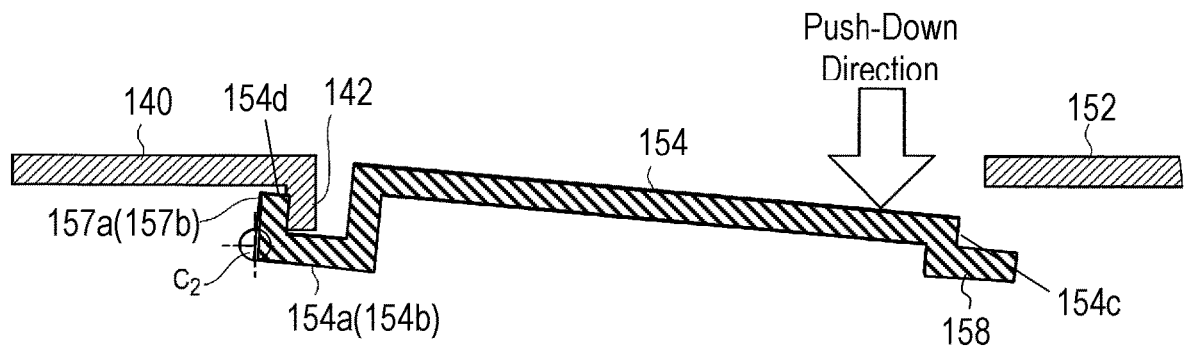
FIG. 7A is a cross-sectional view illustrating a second cover part of a head-up display device according to a second embodiment of the present disclosure, when the second cover part starts turning about a second rotation fulcrum from a state where a cover is closed.

In addition to torsion coil springs 159a and 159b, a configuration described below may be employed. FIG. 7A is a cross-sectional view illustrating another example of second cover part 154 that starts turning about second rotation fulcrum $C_2$, form a state where cover 150 is closed. In this example, housing 140 includes projection part 142 that is disposed along an edge of opening 160 of the housing. The edge is positioned on the driver side of opening 160.

Housing 140 includes a face on the back side of projection part 142. The face confronts second cover part 154 when both first cover part 152 and second cover part 154 cover opening 160. When both first cover part 152 and second cover part 154 cover opening 160, second cover part 154 is engaged with housing 140 at the edge on the opening 160 side in a region. In such a region, when second cover part 154 is pushed downward, projection part 142 of housing 140 and second side surface 154d press against each other. Second side surface 154d is located on the second rotation fulcrum $C_2$ side of second cover part 154. In an example, as shown in FIG. 7A, of side surfaces of first projection part 157a and second projection part 157b, second side surface 154d is a side surface that comes in contact with projection part 142. As described above, second cover part 154 includes first side surface 154c and second side surface 154d. First side surface 154c closer to first rotation fulcrum $C_1$ than second rotation fulcrum $C_2$ is. Second side surface 154d is closer to second rotation fulcrum $C_2$ than first rotation fulcrum $C_1$ is. As an example, first projection part 157a and second projection part 157b are disposed in first end part 154a and second end part 154b of second cover part 154, respectively. Note that, as to the projection part, two projection parts 142 may be disposed so as to individually come in contact with first projection part 157a and second projection part 157b. Alternatively, only one projection part 142 may be disposed along opening 160 so as to come in contact with both of first projection part 157a and second projection part 157b.

In FIG. 7A, upon being pushed downward, second cover part 154 is forced to start turning about second rotation fulcrum $C_2$. At that time, however, projection part 142 disposed to housing 140 interferes with the moving path of first projection part 157a. Likewise, projection part 142 interferes with the moving path of second projection part 157b as well. The force pushing second cover part 154 downward acts on second rotation fulcrum $C_2$ as a lever force that pushes second rotation fulcrum $C_2$ in a radial direction that centers on first rotation fulcrum $C_1$. Such a lever force is yielded using contact points, as a fulcrum, between projection part 142 and both first projection part 157a and second projection part 157b. In this case, second cover part 154 does not turn about second rotation fulcrum $C_2$ easily. That is, even when second cover part 154 is pushed downward, second cover part 154 is unable to easily turn with respect to first cover part 152.

On the other hand, in cover 150 in the closing state, gear part 440 that is fixed to first cover part 152 is fixed so as not to be rotated. Accordingly, even when either first cover part 152 or second cover part 154 is pushed downward, first cover part 152 does not turn about first rotation fulcrum $C_1$ easily. That is, in cover 150 in the closing state, even when cover 150 is pushed downward, it is difficult to change the closing state. In the closing state, cover 150 covers opening 160 while first cover part 152 and second cover part 154 are substantially flush with each other. Therefore, the contact state between cover 150 in the closing state and housing 140 can be more stably kept, even when the cover is subjected to the force that pushes second cover part 154 downward.

Figure 7B:
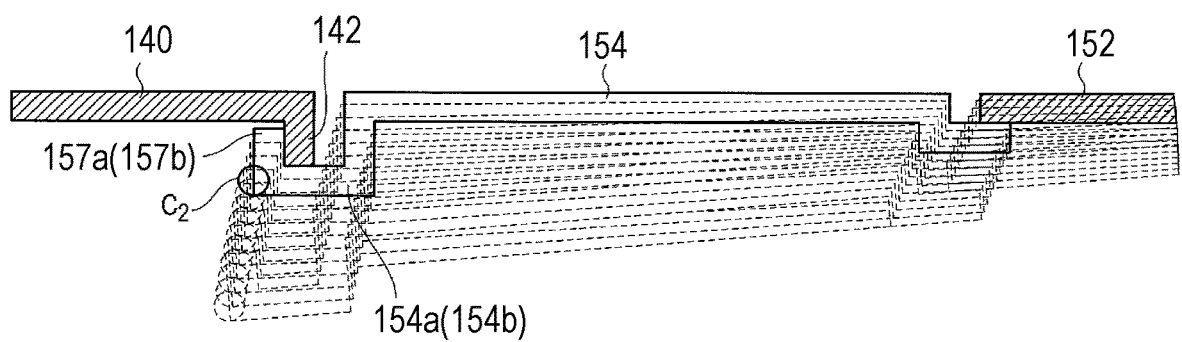
FIG. 7B is a view for illustrating the second cover part of the head-up display device according to the second embodiment of the present disclosure, when the second cover part starts turning about a first rotation fulcrum from a state where the cover is closed.

FIG. 7B is a view for illustrating another example of second cover part 154 of cover 150, when the second cover part starts rotating about first rotation fulcrum $C_1$ from the closing state. In a case where cover 150 turns about first rotation fulcrum $C_1$, projection part 142 interferes with neither the moving path of first projection part 157a nor the moving path of second projection part 157b. Therefore, neither projection part 142, first projection part 157a, nor second projection part 157b is an obstacle to the release operation of cover 150.

Other Exemplary Embodiments

In the first and second embodiments, when first cover part 152 is being released, cover 150 is in contact with the bottom part of housing 140 only with the two portions, i.e. first engagement part 156a and second engagement part 156b of second cover part 154. Instead of this, when first cover part 152 is being released, cover 150 may be in contact with the bottom part of housing 140 only with other two portions, i.e. first end part 152a and second end part 152b of first cover part 152.

Moreover, in the second embodiment, housing 140 includes projection part 142 that is disposed along the edge on the opening 160 side of housing 140, where the edge is positioned on the driver side of opening 160. Instead of this, housing 140 may include projection parts that are individually disposed at least two respective positions in the vicinity of the edge on the opening 160 side of housing 140. Alternatively, housing 140 may be provided with one or more grooves that are fit onto projection part 142 when cover 150 is closed. The one or more grooves are disposed either along the edge on the opening 160 side of housing 140, or at least two positions in the vicinity of the edge on the opening 160 side of housing 140. Moreover, the one or more grooves may have a guiding shape, i.e. the more the groove depth, the narrower the groove width is, while projection part 142 to be fit into the one or more grooves has a trapezoidal cross-section that is fit for the guiding shape. Alternatively, second cover part 154, instead of housing 140, may include one or more grooves.

In the second embodiment, first projection part 157a and second projection part 157b are disposed in first end part 154a and second end part 154b, respectively. Instead of first projection part 157a and second projection part 157b, second cover part 154 may include a third projection part (not shown) to be in contact with projection part 142 of housing 140. The third projection part is disposed in the vicinity of a middle portion, for example, between first end part 154a and second end part 154b.

As described above, the Head-up display device according to the present disclosure is preferably mounted, using only a small space, to the instrumental panel of a vehicle.

What is claimed is:

1. A head-up display device, comprising:
   a projector that projects light;
   a mirror that reflects the light projected by the projector;
   a combiner on which the reflected light is projected;
   a housing accommodating the projector and the mirror, the housing provided with an opening through which the reflected light passes to be projected on the combiner;
   a cover including:
      a first cover part; and
      a second cover part, the first cover part and the second cover part covering the opening; and
   a biasing member that biases the second cover part toward an outside of the housing when the first cover part and the second cover part cover the opening,
   wherein the first cover part includes:
      a first rotation fulcrum fixed to the housing, the first cover part being turnable about the first rotation fulcrum with respect to the housing;
      a first end part; and
      a second end part, the first end part and the second end part each being disposed on an end of the first cover part farthest from the first rotation fulcrum;
   the second cover part includes:
      a second rotation fulcrum fixed to the first end part and the second end part, the second cover part being turnable about the second rotation fulcrum with respect to the first cover part wherein:

the biasing member is connected to a coupler that couples the second cover part to the first cover part, and the biasing member biases the second cover part toward an outside of the housing such that contact is maintained between an upper surface of an engagement part of the second cover part and a lower surface of a third end part of the first cover part, when the first cover part and the second cover part cover the opening.

2. The head-up display device according to claim 1, further comprising a rotary shaft coupling the first cover part and the second cover part turnably about the second rotation fulcrum, wherein the biasing member is a torsion coil spring disposed to embrace the rotary shaft.

3. The head-up display device according to claim 1, wherein the housing includes a housing end part disposed along the opening, when the first cover part and the second cover part cover the opening, the second cover part and the housing end part are locked with each other in a locking region, and when the second cover part is pushed downward while the first cover part and the second cover part cover the opening, the housing and the second side surface of the second cover part press against each other in the locking region.

4. The head-up display device according to claim 3, wherein the second cover part includes:

a first projection part disposed in a vicinity of the first end part; and a second projection part disposed in a vicinity of the second end part; and wherein the first projection part and the second projection part are engaged at a housing projection part disposed in the housing end part along the opening when the first cover part and the second cover part cover the opening.

5. The head-up display device according to claim 1, wherein the housing includes:

a housing bottom part; and a housing end part disposed along the opening, the second cover part includes:

a first locking part disposed in a vicinity of the first end part; and a second locking part disposed in a vicinity of the second end part, when the first cover part and the second cover part cover the opening, the first locking part and the second locking part are locked with the housing end part; and when the first cover part is turned with respect to the housing, the first locking part and the second locking part are locked with the housing bottom part, and a part of the second cover part is pressed against the housing bottom part to cause the second cover part to turn about the second rotation fulcrum with respect to the first cover part.

6. The head-up display device according to claim 5, wherein the second cover part further includes a third locking part in a vicinity of the first side surface, the first cover part further includes a side surface facing the first side surface of the second cover part;

when the first locking part and the second locking part are locked with the housing end part disposed along the opening, the third locking part is in contact with a vicinity of the side surface of the first cover part; and when the first locking part and the second locking part are locked with the housing bottom part, the third locking part is in contact with the housing bottom part.

* * * * *